(12) United States Patent
Platini et al.

(10) Patent No.: US 11,620,539 B2
(45) Date of Patent: Apr. 4, 2023

(54) METHOD AND DEVICE FOR MONITORING A PROCESS OF GENERATING METRIC DATA FOR PREDICTING ANOMALIES

(71) Applicant: BULL SAS, Les Clayes Sous Bois (FR)

(72) Inventors: Marc Platini, Grenoble (FR); Adrien Besse, Versailles (FR); Benoît Pelletier, Saint Etienne de Crossey (FR)

(73) Assignee: BULL SAS, Les Clayes Sous Bois (FR)

( * ) Notice: Subject to any disclaimer, the term of this patent is extended or adjusted under 35 U.S.C. 154(b) by 1022 days.

(21) Appl. No.: 16/200,382

(22) Filed: Nov. 26, 2018

(65) Prior Publication Data

US 2019/0164067 A1 May 30, 2019

(30) Foreign Application Priority Data

Nov. 27, 2017 (FR) ...................................... 1761194

(51) Int. Cl.
*G06N 20/00* (2019.01)
*G06N 5/025* (2023.01)
(Continued)

(52) U.S. Cl.
CPC ......... *G06N 5/025* (2013.01); *G06F 11/3058* (2013.01); *G06F 11/3072* (2013.01);
(Continued)

(58) Field of Classification Search
None
See application file for complete search history.

(56) References Cited

U.S. PATENT DOCUMENTS

| 2010/0161810 | A1* | 6/2010 | Vaidyanathan | ..... G06F 11/3006 709/228 |
| 2012/0240185 | A1* | 9/2012 | Kapoor | ............... H04L 41/0866 726/1 |

(Continued)

FOREIGN PATENT DOCUMENTS

EP 2882139 A1 6/2015

OTHER PUBLICATIONS

Search Report and Written Opinion from French Patent App. No. 1761194 (dated Sep. 7, 2018).

*Primary Examiner* — David R Vincent
(74) *Attorney, Agent, or Firm* — Meagher Emanuel Laks Goldberg & Liao, LLP

(57) ABSTRACT

A device (DS) monitors a process using at least one electronic device (EE1-EE4) in operation and generating first data of a metric. This device (DS) comprises:
- learning means (MA) configured to analyse automatically second data which are representative of events that have occurred in the course of the process, in order to determine anomalies of a chosen type, and then automatically determine an indicator representative of this metric, then a correlation between these determined anomalies and this indicator, and then at least one rule defining this correlation, and
- monitoring means (MS1) configured to analyse newly generated first data periodically, and group by group, by checking whether at least one value of the indicator determined on the basis of the aforesaid data satisfies this determined rule, in order to predict the occurrence of the anomaly in a future group of first data when this at least one value satisfies this rule.

11 Claims, 2 Drawing Sheets

Figure 1:
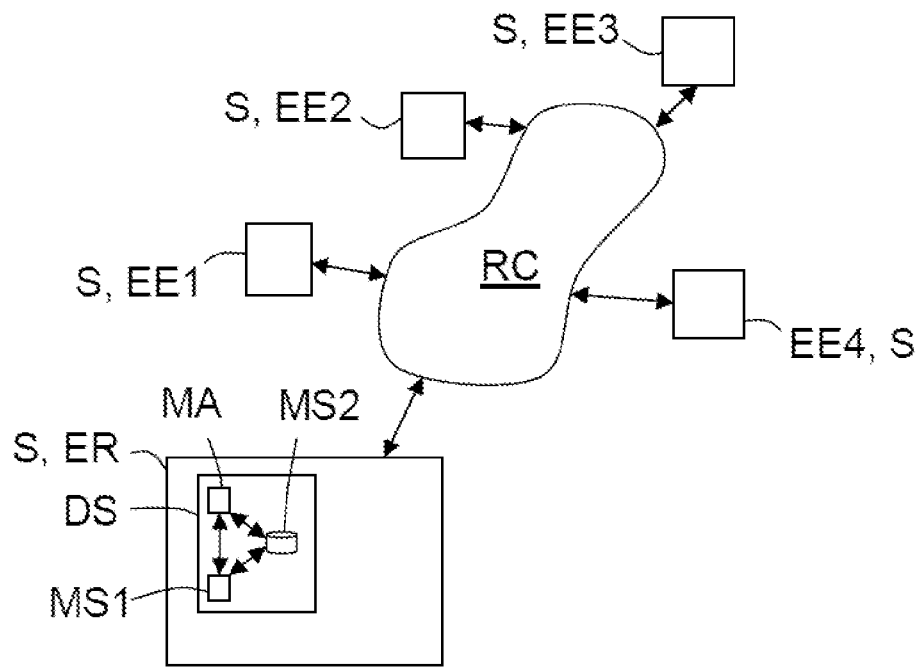

(51) Int. Cl.
  *G06F 11/30*  (2006.01)
  *G06F 17/15*  (2006.01)
  *G06F 17/18*  (2006.01)
  *G06N 5/022*  (2023.01)

(52) U.S. Cl.
  CPC .............. *G06F 17/15* (2013.01); *G06F 17/18* (2013.01); *G06N 5/022* (2013.01); *G06N 20/00* (2019.01)

(56) References Cited

U.S. PATENT DOCUMENTS

| | | | |
|---|---|---|---|
| 2015/0269050 A1* | 9/2015 | Filimonov | G06N 20/10 702/183 |
| 2016/0088006 A1* | 3/2016 | Gupta | H04L 43/08 706/12 |
| 2016/0274990 A1* | 9/2016 | Addleman | G06F 11/3409 |
| 2016/0342903 A1* | 11/2016 | Shumpert | G06F 11/008 |
| 2018/0189667 A1* | 7/2018 | Tsou | G06N 5/003 |
| 2018/0306476 A1* | 10/2018 | Brady | F25B 49/005 |

\* cited by examiner

METHOD AND DEVICE FOR MONITORING A PROCESS OF GENERATING METRIC DATA FOR PREDICTING ANOMALIES

The invention relates to the field of the monitoring of processes which use at least one electronic device in operation and which generates data.

Some systems, such as high-performance computers (HPCs), are used in processes which generate data for a metric or metrics.

The term "metric" is here taken to mean a variable that may take predefined alphanumeric values. These values are supplied by at least one electronic device, such as a sensor or a probe (possibly for measuring temperature or pressure), a computer unit, a processor (or CPU, for "Central Processing Unit"), an electronic circuit card, or a controller. Therefore a metric may be, for example, a temperature, a passband, a number of inputs/outputs used, a response time, an execution time, a resource consumption, or a percentage of processing capacity used, depending on the process in question.

Persons skilled in the art are aware that events, notably anomalies, such as overheating, an increasingly long response time, or an increasingly high percentage of processing capacity used, may occur in a computer unit or an electronic circuit card in the course of a process generating metric data. Some of these anomalies may be followed by a failure or temporary unavailability of at least one electronic device concerned, which may be harmful to users. This the case, for example, when some of the computing resources offered by a high-performance computer or computer unit are no longer available, making it impossible to perform large-scale computation and/or processing of numerical data and/or checks on electronic devices.

In many cases, if the imminent occurrence of an anomaly can be predicted, this may allow measures to be taken to avoid a failure or temporary unavailability of at least one electronic device. However, as the number of metric data generated by a process increases, it becomes harder to predict the imminent occurrence of an anomaly, particularly for a person.

At present, process monitoring methods simply analyse the data representative of the events (or "logs") occurring in the course of a process. When at least one event representative of a chosen type of anomaly is detected, an alert is generated so that possible measures may be taken. A major drawback of this type of process monitoring method is that the alert is generated only after the anomaly has occurred and has been detected, and therefore when it is too late, in many cases, to take any truly effective measures. Furthermore, the known process monitoring methods are almost always specific to the process studied and/or to the system used in this process, and therefore cannot be generalized.

The object of the invention is, notably, to improve the situation.

The invention concerns a method for monitoring a process using at least one electronic device in operation and generating first data of a metric. The method comprises a learning step comprising: analysing automatically second data, representative of events that have occurred during said process, in order to determine anomalies of a chosen type; and automatically determining an indicator representative of said metric, then a correlation between said determined anomalies and said indicator, and then at least one rule defining said correlation. The method comprises a monitoring step comprising: automatically analysing, periodically and group after group, newly generated first data, by checking whether at least one value of said indicator, determined on the basis of the aforesaid data, satisfies said determined rule, in order to predict the occurrence of said anomaly in a future group of first data when this at least one value satisfies said rule.

Thus it is now possible to truly predict the occurrence of an anomaly before it appears, making it possible, notably, to take effective measures in anticipation.

The monitoring method according to the invention may have other characteristics which may be considered separately or in combination, notably:

in the learning step, the indicator may be determined automatically among a plurality of statistical indicators;

in the learning step, it is possible to determine, among the statistical indicators, the one that best represents a temporal variation characteristic of a change of behaviour of the metric;

in the learning step, the metric may be chosen from group comprising a temperature, a passband, a number of inputs/outputs used, a response time, an execution time, a resource consumption, and a percentage of processing capacity used;

in the learning step, the rule may be determined on the basis of predefined models which are supplied with the first data;

in the learning step, it is possible to determine a rule that has the highest percentage correlation with the anomaly among the rules resulting, respectively, from the predefined models supplied with the first data;

the predefined models may be chosen from a group comprising forests of decision trees (or "random forests"), linear regressions and neural networks;

in the monitoring step, it is possible to group together within each group the last N first data generated, where N 2, in sliding windows, and to analyse the N first data of the last group formed on the basis of the determined rule, so as to predict the occurrence of the anomaly in the next group of first data when the first data of the second group follow this rule.

The invention also concerns a computer readable storage medium storing a set of instructions which, when executed by a processor, cause an execution of steps of a monitoring method of the type described above for monitoring a process using at least one electronic device in operation and generating first data of a metric.

The invention also concerns a device for monitoring a process using at least one electronic device in operation and generating first data of a metric, and comprising:

learning means configured to analyse automatically second data which are representative of events that have occurred in the course of the process, in order to determine anomalies of a chosen type, and configured to automatically determine an indicator representative of the metric, then a correlation between the determined anomalies and this indicator, and then at least one rule defining this correlation, and monitoring means configured to analyse newly generated first data, automatically, periodically, and group by group, by checking whether at least one value of this indicator determined on the basis of the aforesaid data satisfies this determined rule, in order to predict the occurrence of the chosen type of anomaly in a future group of first data when said at least one value of the indicator satisfies this rule.

The invention also concerns a device for monitoring a process using at least one electronic device in operation and generating first data of a metric, the device comprising at least one processor, at least one memory operatively coupled to said at least one processor, said at least one memory comprising a set of instructions configured to, when executed by said at least one processor, cause an execution by said device of steps of a method comprising:

i) a learning step (10-50) comprising analysing automatically second data, representative of events that have occurred during said process, in order to determine anomalies of a chosen type, and automatically determining an indicator representative of said metric, then a correlation between said determined anomalies and said indicator, and then at least one rule defining said correlation, and ii) a monitoring step (60-80) comprising automatically analysing, periodically and group after group, newly generated first data, by checking whether at least one value of said indicator, determined on the basis of the aforesaid data, satisfies said determined rule, in order to predict the occurrence of said anomaly in a future group of first data when said at least one value satisfies said rule.

The invention also concerns a system comprising at least one electronic device used in a process generating first data of a metric, and a monitoring device of the type described above.

Such a system may, for example, form a high-performance computer (HPC).

Figure 3:
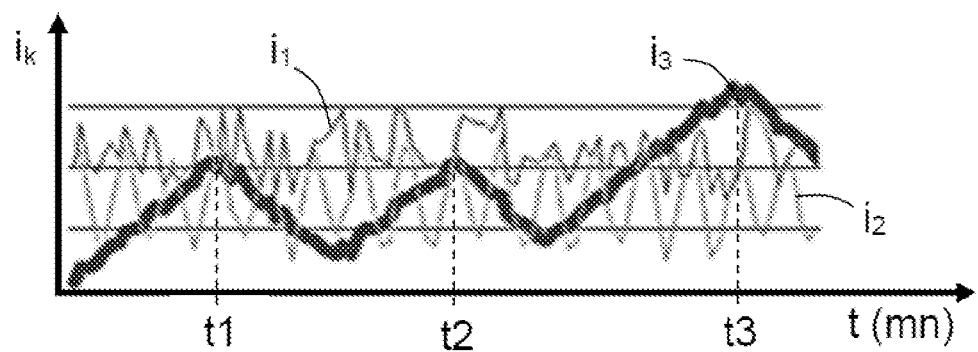
Figure 2:
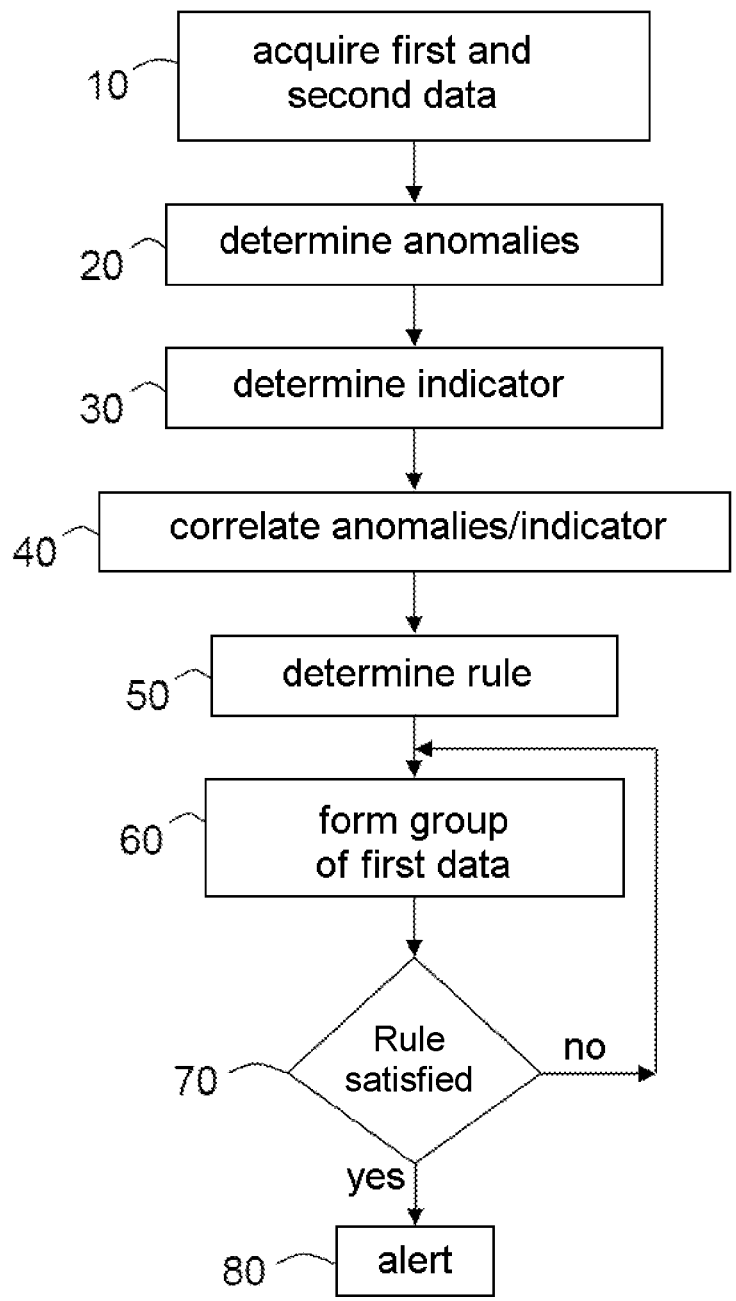

Other characteristics and advantages of the invention will be apparent from a perusal of the following detailed description and the attached drawings, in which:

FIG. 1 shows, in a schematic and functional way, a network device equipped with an example of embodiment of a monitoring device according to the invention and coupled to a communication network to which computer units forming part of a high-performance computer are also coupled, FIG. 2 shows an example of an algorithm executing a process monitoring method according to the invention, and FIG. 3 shows in a diagram the temporal variation of three indicators which are different but represent the same metric.

The invention is intended, notably, to propose a monitoring method, and an associated monitoring device DS, designed to allow the monitoring of a process which uses at least one electronic device EEj in operation and which generates first data of a metric.

In the following text, by way of non-limiting example, the data generating process is assumed to use a system S which forms a high-performance computer (HPC). However, the invention is not limited to this type of system. Indeed, it relates to any system including at least one electronic device used in a process for generating metric data. Thus it also relates to computing platforms distributed in aggregates (or "clusters") in the widest sense, platforms for large-scale or repetitive processing, computers (which may be portable), communication devices, installations (which may be industrial), and buildings. As a general rule, the invention relates to all systems that vary over time.

It is also assumed in the following text, by way of non-limiting example, that the high-performance computer S consists of a plurality of computer units EEj interconnected via at least one communication network RC (which may be private). It should be noted, that, in a variant, the high-performance computer S could form part of a computing cloud or the internet.

Furthermore, it is assumed in the following text, by way of non-limiting example, that the metric is a temperature. It is therefore defined by first data supplied by temperature sensors fitted to the electronic devices EEj. For example, when the temperature of an Intel® processor is monitored, a metric called DTS ("Digital Thermal Sensor") is used, which represents, more precisely, the distance between the current temperature of the processor (or CPU) and the maximum value of this temperature (it is therefore negative or zero). However, the invention is not limited to this type of metric. Indeed, it relates to any metric whose values are generated during a process. Thus it also relates to a passband, a number of inputs/outputs used, a response time, an execution time, a resource consumption, and a percentage of processing capacity used, for example.

FIG. 1 shows, in a schematic and functional way, a communication network RC to which are coupled a network device ER equipped with a non-limiting example of embodiment of a monitoring device DS according to the invention, and electronic devices EEj forming part of a system S which in this case constitutes a high-performance computer S.

In the example illustrated in a non-limiting way, the number of electronic devices EEj (computer units in this case) is equal to four (j=1 to 4). However, this number may take any value greater than or equal to one (1).

As mentioned above, the invention concerns a method intended to monitor a process using at least a part of the system S (and more precisely at least one electronic device EEj of the latter (S)).

A monitoring method according to the invention comprises first and second steps which may be executed by means of a monitoring device DS comprising at least learning means MA and monitoring means MS1.

As shown in a non-limiting way in FIG. 1, this monitoring device DS may, for example, be completely installed in a network device ER coupled to the system S, and possibly forming part of the latter (S), as shown in a non-limiting way in FIG. 1. Such a network device ER may, for example, be dedicated to the monitoring of the system S. However, the monitoring device DS could be distributed in a plurality (at least two) of electronic device which may be dedicated. Thus its learning means MA could, for example, form part of a network device, and its monitoring means MS1 could, for example, be installed in the different electronic devices EEj of the system S. Therefore a monitoring device DS, according to the invention, may be made in the form of software modules (or computing modules), in which case it is a computer program product comprising a set of instructions which, when executed by processing means such as electronic circuits (or "hardware"), is capable of executing the monitoring method, or in the form of a combination of software modules and electronic circuits.

In a first step, called the learning step (also referred to herein as the learning phase) of the method according to the invention, the method (e.g. the learning means MA of the (monitoring) device DS) includes analysing automatically second data which are representative of events (or logs) occurring during the process in question, in order to determine the anomalies of a chosen type. In this first step, the analysis may be performed on the basis of at least one keyword. Such a keyword may be used to identify anomalies in the second data. Any alphanumeric sequence may be used as a keyword for this analysis. Numerically coded keywords may be used, for example.

For example, if the metric is a temperature measured in an electronic device EEj, the anomalies to be found may be overheating warnings in this electronic device EEj at certain instants. In this case, the keyword to be found in the analysed second events data may be "overheating".

The second data that are analysed have been acquired in advance while the process was taking place in the system S. These second data are generated by the electronic devices EEj of the system S which are subject to monitoring, or by another electronic device dedicated to monitoring these devices (EEj). For example, in the case of the DTS metric, the events (or logs, or second data) are generated by a temperature module which is usually integrated in the processor or CPU. However, in the case of a cooling circuit for a computer or CPUs, the events (or logs, or second data) are generated by an external probe. It should be noted that the second data are stored in correspondence with the instants when they were respectively generated, for example in storage means MS2 which may form part of the monitoring device DS, as illustrated in a non-limiting way.

It should also be noted that first data for the metric to which the process relates (a temperature in this case) have also been acquired in advance while the process was taking place in the system S. These first data are generated by the electronic devices EEj of the system S which are subject to monitoring, or by other electronic devices dedicated to monitoring these devices (EEj), for example temperature sensors. It should be noted that these first data are stored in correspondence with the instants when they were respectively generated, for example in storage means MS2.

The acquisition of the first and second data corresponds to sub-step 10 of the example of an algorithm in FIG. 2, which uses a process monitoring method according to the invention. The determination of the anomalies of a chosen type corresponds to sub-step 20 of the example of an algorithm in FIG. 2.

The first step of the method according to the invention continues with the automatic determination (by the learning means MA) of an indicator $i_k$ which is representative of the metric in question (a temperature in this case).

This determination of an indicator $i_k$ corresponds to sub-step 30 of the example of an algorithm in FIG. 2.

For example, in the first step, the method (e.g. the learning means MA) may automatically determine the indicator $i_k$ among a plurality of statistical indicators. The latter are very suitable for the case in which the number of first data in the metric is very large, because they may provide an indication representative of a large number of first data belonging to the same time interval, thereby reducing the complexity of the input data.

Many statistical indicators may be used, notably a mean value, a standard deviation or a histogram. The last of these is particularly useful when the number of first data in the metric is very large.

Thus, if a first data element of the metric is available every minute, it is possible, for example, to plot a histogram of the first data in time intervals of five minutes. In this case, each time interval is associated with five successive first data elements. For example, if a time interval of five minutes includes the first five data elements [1,35,20,2,3] (in absolute values), the following histogram may be plotted: in the interval of values [1-10[ there are three first data elements [1,2,3], in the range of values [10-20[ there is no first data element, in the range of values [20-30[ there is a first data element [20], in the range of values [30-40[ there is a first data element [35], and in the range of values [0-+∞[ there is no first data element. The number of first data elements in each range of values is then normalized with respect to the total number of values (equal to five in this case), in order to find the percentage of first data per range of values. Thus we obtain the percentage of 60% (or 0.6) associated with the range of values [1-10[, the percentage of 0% (or 0) associated with the range of values [10-20[, the percentage of 20% (or 0.2) associated with the range of values [20-30[, the percentage of 20% (or 0.2) associated with the range of values [30-40[, and the percentage of 0% (or 0) associated with the range of values [0-+∞[. Here, therefore, the indicator $i_k$ consists of the percentages associated respectively with the four different possible ranges of values for the metric, for the time interval of five minutes in question.

It should be noted that the size of each time interval and the size of each range of values may vary so as to be adapted to each type of first metric data, to the respective frequencies of acquisition of the first and second data, and to the number of electronic devices EEj monitored. This is because the objective is to be able to adjust the intervals of the histogram dynamically on the basis of the input of first data.

By way of example, in the first step, the method (e.g. the learning means MA) may, for example, determine, among the statistical indicators, the one that best represents a temporal variation characteristic of a change of behaviour of the metric. For this purpose, a number of statistical indicators are determined by the learning means MA from the same set of first data stored, and the learning means MA retain the one that best represents a temporal variation characteristic of the change of behaviour of the metric.

The respective variations with time (evolution) of three indicators $i_k$ (k=1 to 3) which are different but representative of the same metric are represented in FIG. 3. As may be seen, the curve of the indicator $i_3$ is therefore particularly representative of a temporal variation characteristic of a change of behaviour of the metric, whereas no direct learning can be obtained in relation to this metric from the curves of the other two indicators $i_1$ and $i_2$. In such a situation, it is therefore the indicator $i_3$ that will be chosen by the learning means MA to characterize the changes of behaviour of the metric.

The first step of the method according to the invention continues with the automatic determination (e.g. by the learning means MA) of a correlation between the anomalies which have been determined in the second data stored and the indicator $i_k$ which has just been determined on the basis of the first data stored.

In one or more examples, the determination of a correlation between the anomalies and the indicator includes the determination of a correlation between the occurrence of one or more anomalies and the evolution of the indicator. This correlation may be a temporal correlation between the occurrence of one or more anomalies and one or more events in the evolution of the indicator. An event is, for example, a change in the evolution of the indicator or a particular property at a given time in the evolution of the indicator. This event may, for example, be a transition from growth to decline of the indicator or vice versa, a transition to a local maximum or minimum, a transition to a threshold value, a decrease/growth above a threshold, etc. The event may be detected/predicted by an analysis of the evolution of the indicator in time and/or frequency domain.

Any correlation determination technique known to those skilled in the art may be used in this case. Thus it is possible, for example, to determine whether each anomaly at a given instant t is temporally correlated with a change of the determined indicator $i_k$ from increase to decrease, or conversely with a change of the determined indicator $i_k$ from decrease to increase. This is the case, notably, in the non-limiting example shown in FIG. 3. In fact, there is a correlation between each change from increase to decrease of the indicator $i_3$ occurring at the instants t1, t2 and t3 and anomalies occurring immediately after these instants t1, t2 and t3. However, other correlations may be determined. Thus it is possible, for example, to determine whether each anomaly at a given instant t is temporally correlated with a local maximum or a local minimum of the determined indicator $i_k$, or with a particular variation of a mean, or with a standard deviation above a threshold, or with a threshold distance between anomalies (the technique called DTW (or "Dynamic Time Warping")).

The correlation determination corresponds to sub-step 40 of the example of an algorithm in FIG. 2.

The first step (learning step) of the method according to the invention terminates with the automatic determination (by the learning means MA) of at least one rule defining the correlation that has just been determined.

This determination of a rule or rules corresponds to sub-step 50 of the example of an algorithm in FIG. 2.

According to one or more examples, a rule may be a rule intended to be applied to an indicator to determine whether the indicator satisfies the rule, at least at some moment of its evolution. The rule may be applied, for example, to determine whether one or more indicator values verify one or more predefined conditions. The rule may be applied to the indicator to determine, in the evolution of the indicator, the occurrence of at least one event corresponding to the occurrence of at least one anomaly among anomalies for which a correlation has been detected with this indicator. The rule may be applied over a given time interval of the indicator's evolution (for example, over a group of the first data) or at a given time of its temporal evolution (for example, a value of the metric at a given time) or over a set of indicator values. Thus, as explained in more detail below, it is then possible, by applying the rule and thus analyzing only the evolution of the indicator, to predict the occurrence of an anomaly.

For example, in the first step, the method (the learning means MA) may determine the rule, or each rule, on the basis of predefined models which are supplied with the first data stored.

These models may be for example models for analyzing the evolution of an indicator, for example for analyzing the evolution of the indicator in time and/or frequency domain in order to extract one or more temporal and/or frequency characteristics of the evolution of the indicator.

These predefined models may, for example, be stored in the learning means MA or in the storage means MS2.

Additionally, these predefined models may, for example and in a non-limiting way, be chosen from a group comprising forests of decision trees (or "random forests"), linear regressions and neural networks. For example, the case of forests of decision trees, trees with branches and leaves are constructed on the basis of the first data stored. The branches represent the links between the rules, and the leaves represent the rules. Since the construction of this type of decision tree is well known to those skilled in the art, it is not described below. It will simply be pointed out that a plurality of trees are constructed on the basis of the same set of first data in order to place them in "competition". This is because the rules established by a tree are based on probabilistic and non-deterministic methods, and therefore a plurality of trees (a forest) will not necessarily produce the same rules. The best tree or trees of the forest may therefore be selected subsequently, for example.

By way of example, in the first step, the method (the learning means MA) may determine the rule, or each rule, that has the highest percentage correlation with the anomalies detected among the rules resulting, respectively, from the predefined models supplied with the first data.

For example, a rule is used to detect predefined events in the evolution of an indicator and a correlation measure (e.g., a percentage correlation, a correlation rate) between detected events and the occurrence of one or more anomalies of a given type is determined. This correlation measurement may be performed over a given time interval of the indicator's evolution or at a given time of its temporal evolution or over a set of indicator values.

By way of illustrative example, a rule suitable for the variation of the indicator $i_3$ shown in FIG. 3 may be "have we reached the end of a phase of increase of the indicator $i_3$? More formally, this rule may be written $x(t+1)<x(t)$, preferably taking a plurality of values to be subtracted from the noise. In the latter case, we may have a rule such that $x(t+1)<x(t)$ ET $x(t+2)<x(t)$ ET $x(t+1)<x(t-1)$ ET $x(t+1)<x(t-2)$.

When the rule, or each rule, has been determined, the learning phase of the monitoring device DS is terminated for the metric in question and for the system S in question. The second step, called the monitoring step, of the method according to the invention may then begin.

In this second step (also referred to herein as the monitoring step or monitoring phase), the method (the monitoring means MS1 of the monitoring device DS) brings together the newly and subsequently generated first data within groups. These groups are analysed by the monitoring means MS1, one after another, as they are created (that is to say, on the fly), automatically and periodically. For this purpose, the monitoring means MS1 check whether the value of the indicator $i_k$, determined on the basis of the first data of the analysed group, satisfies the rule, or each rule, determined. For example, the occurrence of a particular event in the evolution of the indicator is determined. If this indicator value satisfies this rule, the monitoring means MS1 predict the occurrence of an anomaly of the chosen type in a future group of first data (not yet generated).

In order to carry out this check, the monitoring means MS1 may determine in advance the value taken by the indicator $i_k$, with the first data of the analysed group.

This second step corresponds to sub-steps 60 to 80 of the example of an algorithm in FIG. 2. More precisely, in this algorithm a group of first data is formed in sub-step 60, and a check is then made in the test of sub-step 70 if this group satisfies the rule, or each rule, determined (via the associated value of the indicator $i_k$). If the result of the test is negative (and therefore if the group does not satisfy the rule or each rule (via the associated value of the indicator $i_k$)), then the monitoring means MS1 return to execute sub-step 60 in order to form a new group of first data to analyse. On the other hand, if the result of the test is positive (and therefore if the group satisfies the rule or each rule (via the associated value of the indicator $i_k$)), then the monitoring means MS1 may, for example, trigger the generation of an alarm in a sub-step 80.

This alarm may be a text or audible message sent to the controller of the network device ER and/or to each controller of an electronic device EEj for which a future anomaly has been predicted.

Evidently, the purpose of the alarm is to trigger the taking of an effective measure or measures in anticipation. It would also be feasible for the monitoring device DS to be arranged so as to propose measures (or actions) to be taken to prevent the occurrence of the predicted anomaly. Thus, a preventive measure (or action) may be an increase in the power of the cooling system of the processor subject to the anomaly prediction, or may be the transfer of at least some of a calculation to a processor which is not subject to the anomaly prediction, and which is therefore "cold".

It should be noted that, in order to follow the variation of the first data in real time, it is advantageous to operate in what is known as a sliding window mode. For this purpose, each new group (m) of N first data that is formed may comprise the (N−1) most recent first data of the preceding group (m−1), plus the latest first data element generated by the process. For example, if N=5, the new group (m) of 5 first data that is formed comprises the 4 most recent first data of the preceding group (m−1), plus the latest first data element generated by the process. Thus it is possible to carry out continuous, real time monitoring of the first data generated, which optimizes reactivity.

It should be noted that the real time monitoring of the electronic devices EEj via the associated first data (produced by the process in question) may be carried out in a centralized or a distributed way. In the centralized case, the monitoring means MS1 are installed in a single device, in this case the network device ER. In the distributed case, the monitoring means MS1 are installed in a plurality of devices, for example in each electronic device EEj monitored, or in "intermediate" network devices, each of which monitors one or more electronic devices EEj.

Because of the invention, it is now possible to predict efficiently and sufficiently promptly the occurrence of anomalies in a system.

It will be appreciated that the functions depicted and described herein may be implemented in software (e.g., via implementation of software on one or more processors, for executing on a general purpose computer (e.g., via execution by one or more processors) so as to implement a special purpose computer, or the like) and/or may be implemented in hardware (e.g., using a general purpose computer, one or more application specific integrated circuits (ASIC), and/or any other hardware equivalents).

A further embodiment is a computer readable storage medium having a set of instructions stored therein, the set of instructions being configured to, when being loaded by a computer, a processor, or a programmable hardware component, to cause the computer, the processor, or respectively the programmable hardware component to implement one of the above methods. In some embodiments, the computer readable storage medium is non-transitory.

Herein, some embodiments are also intended to cover computer readable storage media, e.g., digital data storage media, which are machine or computer readable and encode machine-executable or computer-executable programs of instructions where said instructions perform some or all of the steps of methods described herein.

The computer readable storage media may be, e.g., digital memories, magnetic storage media such as magnetic disks and magnetic tapes, hard drives, or optically readable digital data storage media.

The embodiments are also intended to cover computers programmed to perform said steps of methods described herein or (field) programmable logic arrays ((F)PLAs) or (field) programmable gate arrays ((F)PGAs), programmed to perform said steps of the above-described methods.

It should further be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

In the present document, functional blocks denoted as "means" configured to perform a certain function shall be understood as functional blocks comprising circuitry that is adapted for performing or configured to perform a certain function. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

The invention is not limited to the embodiments of the monitoring method, the monitoring device, and the system that are described above purely by way of example, but incorporates all variants that may be devised by those skilled in the art, solely within the scope of the claims below.

The invention claimed is:

1. A method for monitoring a process to predict and respond to anomalous behavior in a system-including at least one electronic device in operation generating first data of a metric, the at least one electronic device operably communicating via at least one communication network with a monitoring device, the monitoring device comprising at least one processor and a set of instructions that when executed by the at least one processor cause the monitoring device to perform the method, the method comprising:
  a learning process including:
    automatically analysing second data, representative of events that have occurred during the process, in order to determine anomalies of a chosen type, and
    automatically determining an indicator representative of the metric, then a correlation between the determined anomalies and the indicator, and then at least one rule defining the correlation;
  a monitoring process, including:
    automatically analysing, periodically and group after group, newly generated first data, by checking whether at least one value of the indicator, determined on the basis of the data, satisfies the determined rule, in order to predict the occurrence of the anomaly in a future group of first data when the at least one value satisfies the rule, where the rule is adapted to be applied to said indicator to determine whether, at some point in its evolution, the indicator satisfies the rule; and generating an alarm indicating an anomaly has been predicted when the indicator satisfies the rule, proposing measures to be taken to prevent the occurrence of the anomaly, or a combination thereof, wherein the metric is at least one of temperature, a passband, a number of inputs/outputs used, a response time, an execution time, a resource consumption, and a percentage of processing capacity used.

2. The method according to claim 1, wherein the learning process of the indicator is determined automatically among a plurality of statistical indicators.

3. The method according to claim 2, wherein, the learning process includes determining among the statistical indicators the one that best represents a temporal variation characteristic of a change of behaviour of the metric.

4. The method according to claim 1, wherein, in said learning process said rule is determined on the basis of predefined models supplied with the first data.

5. The method according to claim 4, wherein the learning process includes determining a rule exhibiting the highest percentage correlation with the anomaly among rules resulting, respectively, from the predefined models supplied with the first data.

6. The method according to claim 4, wherein the predefined models are at least one of forests of decision trees, linear regressions and neural networks.

7. The method according to claim 1, wherein, in the monitoring process, the last N first data generated are brought together in each group, where N≥2, in sliding windows, and the N first data of the last group formed are analysed on the basis of the determined rule, so as to predict the occurrence of the anomaly in the next group of first data when the first data of the second group follow the rule.

8. A non-transitory computer readable storage medium configured for storing a set of instructions, wherein, when executed by a processor, cause an execution of the method according to claim 1.

9. A monitoring device for monitoring a process to predict and respond to anomalous behavior in a system using at least one electronic device in operation and generating first data of a metric, the device communicating with the at least one electronic device via at least one communication network, the monitoring device comprising:

at least one processor;

at least one memory operatively coupled to the at least one processor, the at least one memory including a set of instructions that, when executed by the at least one processor, cause the monitoring device to:

perform a learning process, including:
automatically analysing second data, representative of events that have occurred during the process, in order to determine anomalies of a chosen type, and
automatically determining an indicator representative of the metric, then a correlation between the determined anomalies and the indicator, and then at least one rule defining the correlation, and perform a monitoring process, including:
automatically analysing, periodically and group after group, newly generated first data, by checking whether at least one value of the indicator, determined on the basis of the afore the data, satisfies the determined rule, in order to predict the occurrence of the anomaly in a future group of first data when the at least one value satisfies the rule, where the rule is adapted to be applied to said indicator to determine whether, at some point in its evolution, the indicator satisfies the rule; and
generate an alarm indicating an anomaly has been predicted when the indicator satisfies the rule, propose a measure to be taken to prevent the occurrence of the anomaly, or a combination thereof;

wherein the metric is at least one of temperature, a passband, a number of inputs/outputs used, a response time, an execution time, a resource consumption, and a percentage of processing capacity used.

10. A system to predict and respond to anomalous behavior in a system comprising at least one electronic device used in a process generating first data of a metric, wherein the system includes the monitoring device according to claim 9.

11. The system according to claim 10, wherein the system forms a high-performance computer.

* * * * *